July 7, 1925.
F. C. ZEISBERG
1,545,381
BURNING SULPHUR AND RECOVERY OF HEAT GENERATED
Filed July 1, 1921
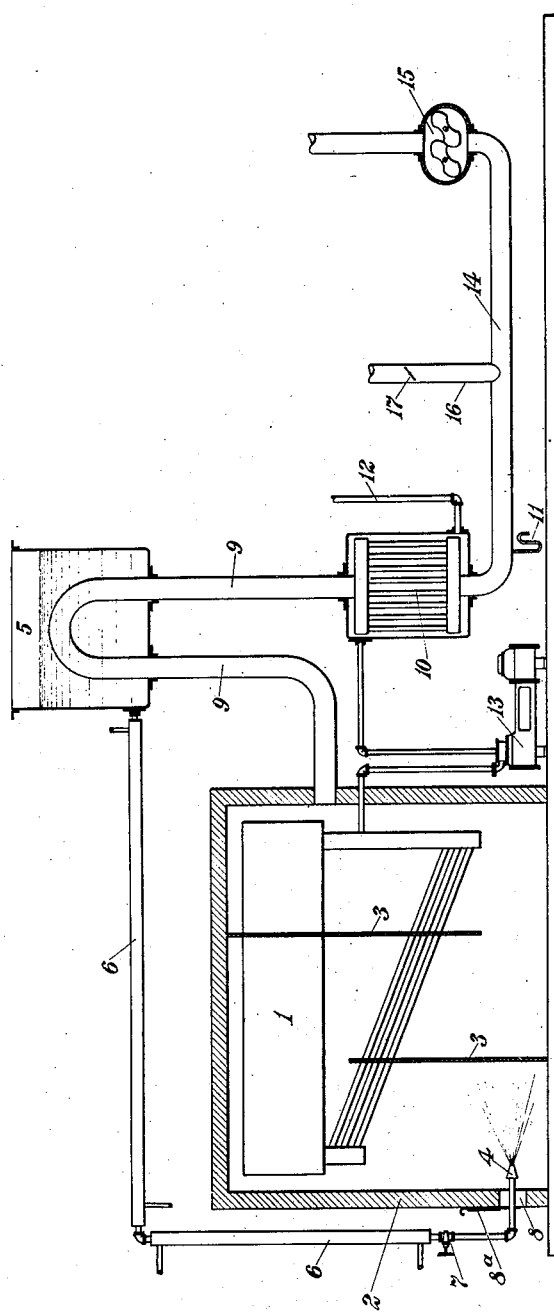
Inventor
F. C. Zeisberg,
By his attorney Patented July 7, 1925.

1,545,381

UNITED STATES PATENT OFFICE.

FRED C. ZEISBERG, OF WILMINGTON, DELAWARE, ASSIGNOR TO E. I. DU PONT DE NEMOURS & COMPANY, OF WILMINGTON, DELAWARE, A CORPORATION OF DELAWARE.

BURNING SULPHUR AND RECOVERY OF HEAT GENERATED.

Application filed July 1, 1921. Serial No. 481,892.

*To all whom it may concern:*

Be it known that I, FRED C. ZEISBERG, a citizen of the United States, and a resident of Wilmington, in the county of New Castle and State of Delaware, have invented a certain new and useful Improvement in Burning Sulphur and Recovery of Heat Generated, of which the following is a specification.

This invention relates to the production of sulphur dioxide, and comprises burning sulphur with air (or oxygen) in such a way as to form combustion products having a temperature approaching that attained with ordinary fuels. The invention pertains especially to the production of sulphur dioxide concurrently with the generation of steam, the necessary heat for the steam being derived from the hot sulphur dioxide gas mixture.

One of the approved methods of producing sulphur dioxide is to burn sulphur in air according to the equation:—

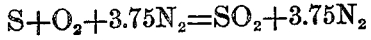

In this reaction 3960 B. t. u. are liberated for every pound of sulphur burned. In most contact sulphuric acid plants the heat generated here is wasted, being dissipated to the air and to water used as a cooling medium in a large variety of ways, and this is also true in the sulphite wood pulp industry, where sulphur is burned to produce sulphur dioxide for making the calcium bisulphite used in this process.

My invention has for its object the burning of sulphur to produce sulphur dioxide in such a way as to facilitate the efficient utilization of the heat generated during combustion. My invention has for its further object a simplification of the means for handling and burning the sulphur and of apparatus for removing the heat from the sulphur dioxide gases produced, since these gases must usually be cooled before being used in chemical reactions.

My invention can best be explained by reference to the attached drawing, which is a diagrammatic side elevation of one form of apparatus with which my invention can be carried out, tho I do not confine myself to the form specified.

In the drawing, 1 is a steam boiler, in this case of the water tube type, tho it may, as is well understood, be of any type whatever. This boiler is set in a brick setting 2, of the usual type, insulated against heat losses and provided with baffles 3, to give the gases of combustion a devious path. In this furnace liquid sulphur is burned, being supplied thru a burner nozzle 4, of the ordinary type used for burning crude oil. The burner is fed from a tank 5, containing molten sulphur thru the steam jacketed line 6, the sulphur flow being controlled by a valve 7. At 8 is an opening in the furnace setting whose size can be regulated, and the regulation of the size of this opening, together with the manipulation of the valve 7, control the ratio of sulphur and air fed to the furnace, and thus regulate the percentage of $SO_2$ in the gases leaving the furnace. The pipe 6 should preferably be jacketed with steam at a temperature below 150° C. and above 125° C., which can conveniently be attained by maintaining a pressure of, say, 30 lbs. per sq. in. gauge pressure in this steam jacket. The purpose of this jacket is to keep the sulphur liquid but to prevent its temperature from rising above 150° C., at which point the viscosity of molten sulphur begins very rapidly to increase.

The products of combustion from the furnace pass out thru the pipe 9, which extends thru the tank 5, giving up to this tank sufficient heat to melt the sulphur which is added at this point in the form of a solid. From 5 the gas passes to the boiler feed water heater 10, which is of the usual type, tho all portions which come in contact with the gas should be of lead, since at this point there is likely to be condensed from the gas a corrosive liquid containing sulphuric and sulphurous acids. This liquid condensate can drain out thru the trap 11, provided for the purpose.

The cold feed water which passes to the heater 10 thru the pipe 12 is supplied to the boiler at the proper rate by the boiler feed pump 13. The gases leaving the water heater thru pipe 14 are kept in motion by a blower 15, which may be of any of the usually accepted types for this purpose. A valved inlet 16 is provided in the pipe 14 for introducing air under certain conditions.

While one method of supplying the molten sulphur to the furnace setting has been described, it is, of course, well understood that the tank 5 may be so situated that the molten sulphur is not supplied to the burner by gravity but is pumped mechanically to the burner, or in fact, if desired, the sulphur may not even be melted but may be powdered and blown into the setting in the well-known way that powdered coal is used for heating purposes.

In order to realize the maximum efficiency of heat recovery, it is, of course, necessary to limit as far as possible the amount of air added at 8, that is, the percentage of $SO_2$ in the gas leaving the furnace should be as high as possible. To give an idea of the magnitude of the heat saving it may be stated that when regulating the air supply so that a gas containing 15% $SO_2$ by volume results, each 2000 lb. ton of sulphur is equivalent in water evaporative effect to 435 lbs. of good steam coal, with the exit temperature from the furnace at 250° C. If the oxygen of the air is completely utilized, that is, if the exit gas contains 21% $SO_2$ by volume, the evaporative effect is equivalent to about 470 lbs. of coal with the same exit temperature.

For sulphite paper mills it is desirable to have the gas strength as high as possible, and by this method of burning it is easily feasible to obtain 15% $SO_2$ by volume in the exit gases from the furnace. Indeed, with careful regulation the percentage may be increased considerably above this figure, but, of course, not beyond the theoretically obtainable figure of 21% by volume.

In contact sulphuric acid plants, however, the gas should for the best operation usually contain not more than 8% $SO_2$ by volume. If enough air were admitted at 8 to give a gas of this composition leaving the furnace, the heat efficiency would be very low. Consequently, in those cases where the sulphur dioxide is to be used in a more dilute condition, I prefer to operate so as to obtain a gas of maximum strength from the furnace, and then, by means of the regulable valve 17 in side connection 16 to the atmosphere, to introduce such an amount of air as will dilute the furnace gas to the deside $SO_2$ concentration, e. g., 8% $SO_2$ by volume for contact sulphuric acid manufacture.

In designing the boiler setting to give an exit gas temperature of 250° C. ordinary good boiler practice is adhered to, and in a climate which is not excessively damp no difficulty will be experienced from the deposition on the steel and iron fittings of the boiler of sulphuric acid from the combustion gases. In case, however, that this should occur, it can easily be avoided by first drying the air which is supplied at 8. This drying may, of course, be carried out by any of the well-known methods, such as refrigeration, by the use of sulphuric acid, etc. Normally, however, drying is not necessary.

As will be apparent from the above description my new process, summarized in general terms, may be said to comprise injecting sulphur, preferably in the molten condition, into a combustion chamber, and burning it with sufficient air to effect complete combustion and to give the maximum temperature practically attainable to the products of combustion, and passing the hot products of combustion into heat-exchanging relation first with a liquid to be vaporized, second with sulphur where molten sulphur is being injected, and third with said liquid to heat the same prior to its vaporization.

I claim:—

1. The method of generating steam and simultaneously generating sulphur dioxide which method comprises injecting sulphur into the combustion chamber of a steam boiler installation in the presence of air substantially merely sufficient in amount to effect complete combustion, thereby to obtain substantially maximum temperature, and firing said sulphur to produce sulphur dioxide and at the same time heat the boiler.

2. The method of generating steam and simultaneously generating sulphur dioxide which method comprises injecting sulphur into the combustion chamber of a steam boiler installation in the presence of air substantially merely sufficient in amount to effect complete combustion, thereby to obtain substantially maximum temperature, firing said sulphur to produce sulphur dioxide and at the same time heat the boiler, and passing the sulphur dioxide from the chamber through the feed water heater of the installation.

3. The method of generating steam and simultaneously generating and preparing sulphur dioxide of a strength suitable for utilization in a given chemical reaction which method comprises injecting sulphur into the combustion chamber of a steam boiler installation in the presence of air substantially merely sufficient in amount to effect complete combustion, thereby to obtain substantially maximum temperature, firing said sulphur to produce sulphur dioxide and at the same time heat the boiler, and then diluting the sulphur dioxide to the strength desired for said reaction.

4. The method of generating steam and simultaneously generating and preparing sulphur dioxide of a strength suitable for utilization in a given chemical reaction which method comprises injecting sulphur into the combustion chamber of a steam boiler installation in the presence of air substantially merely sufficient in amount to effect complete combustion, thereby to obtain substantially maximum temperature, firing said sulphur to produce sulphur dioxide and at the same time heat the boiler, passing the sulphur dioxide from the chamber through the feed water heater of the installation, and then diluting the sulphur dioxide to the strength desired for said reaction.

5. The method of generating steam and simultaneously generating sulphur dioxide which method comprises burning sulphur in the combustion chamber of a steam boiler installation in the presence of such an amount of air that the sulphur dioxide content of the combustion products will be between 14 and 21%, thus firing said sulphur to produce sulphur dioxide and at the same time heat the boiler.

6. The process which comprises injecting sulphur into a combustion chamber in the presence of sufficient substantially dry air to effect complete combustion of said sulphur.

7. The process which comprises injecting sulphur into a combustion chamber and burning it with substantially the amount of air to give the maximum temperature to the products of combustion.

8. The process which comprises burning sulphur with such an amount of air that the sulphur dioxide content of the combustion products will be between about 14 and 21%, bringing said combustion products into heat-exchanging relation with a material to be heated, and then reducing the sulphur dioxide content of said combustion products to less than 9%.

9. In a sulphur-burning and steam-generating installation for producing sulphur dioxide and recovering, through the generation of steam, a substantial part of the heat generated, the combination with a combustion chamber, means for injecting sulphur into said chamber in contact with sufficient air to burn the sulphur, and means for supplying such sulphur to said injecting means, of a steam boiler disposed in said combustion chamber in the path of the hot products of combustion.

In testimony whereof I affix my signature.

FRED C. ZEISBERG.